United States Patent [19]
Craig et al.

[11] Patent Number: 6,118,233
[45] Date of Patent: Sep. 12, 2000

[54] DYNAMIC FOCUS VOLTAGE DISABLING CIRCUIT

[75] Inventors: Randy Wayne Craig, Fishers; John Barrett George, Carmel, both of Ind.

[73] Assignee: Thomson Licensing S.A., Boulogne Cedex, France

[21] Appl. No.: 09/130,974

[22] Filed: Aug. 7, 1998

[51] Int. Cl.[7] .............................. G09G 1/04; H01J 29/70
[52] U.S. Cl. .................... 315/382; 315/382.1; 315/403; 315/408
[58] Field of Search .................................. 315/382, 408, 315/403, 382.1

[56] References Cited

U.S. PATENT DOCUMENTS

| | | | |
|---|---|---|---|
| 4,361,785 | 11/1982 | Stapleton | 315/389 |
| 4,473,780 | 9/1984 | Gent | 315/382 |
| 4,479,228 | 10/1984 | Crane | 375/7 |
| 4,560,910 | 12/1985 | Midland | 315/382 |
| 4,622,498 | 11/1986 | Lester | 315/382 |
| 5,245,254 | 9/1993 | Lee | 315/382 |
| 5,341,071 | 8/1994 | George | 315/382.1 |
| 5,486,741 | 1/1996 | George | 315/382 |
| 5,512,804 | 4/1996 | Yamamoto | 315/382.1 |
| 5,532,558 | 7/1996 | George | 315/382.1 |
| 5,589,883 | 12/1996 | Ogino et al. | 348/379 |
| 5,604,404 | 2/1997 | Sahara | 315/8 |
| 5,714,849 | 2/1998 | Lee | 315/408 |
| 5,831,400 | 11/1998 | Kim | 315/382.1 |

*Primary Examiner*—Seungsook Ham
*Assistant Examiner*—John Patti
*Attorney, Agent, or Firm*—Joseph S. Tripoli; Joseph J. Laks; Sammy S. Henig

[57] ABSTRACT

A video imaging apparatus includes a source of a periodic dynamic focus voltage blanking signal. A dynamic focus voltage amplifier includes a switch responsive to the dynamic focus voltage blanking signal for applying a dynamic focus voltage to a focus electrode, when the switch is at a first state, and for disabling the application of the dynamic focus voltage, when the switch is at a second state to provide for automatic kine bias measurement. A second switch responsive to the focus voltage blanking signal is coupled to the amplifier for applying a current to a stage of the amplifier, when the dynamic focus voltage is disabled. The applied current adjusts the focus voltage, to a level closer to that established immediately after the dynamic focus voltage is enabled for reducing a transient condition.

13 Claims, 2 Drawing Sheets

DYNAMIC FOCUS VOLTAGE DISABLING CIRCUIT

The invention relates to a beam landing distortion correction arrangement.

BACKGROUND

An image displayed on a cathode ray tube (CRT) may suffer from imperfections or distortions such as defocusing or nonlinearity that is incident to the scanning of the beam on the CRT. Such imperfections or distortions occur because the distance from the electron gun of the CRT to the faceplate varies markedly as the beam is deflected, for example, in the horizontal direction. Reducing the defocusing that occurs as the beam is deflected in the horizontal direction, for example, may be obtained by developing a dynamic focus voltage having a parabolic voltage component at the horizontal rate and applying the dynamic focus voltage to a focus electrode of the CRT for dynamically varying the focus voltage. It is known to derive the parabolic voltage component at the horizontal rate from an S-correction voltage developed in an S-shaping capacitor of a horizontal deflection output stage.

The CRT that employs dynamic focus may have internal wiring that places the dynamic focus voltage close to, for example, the blue electron gun. In normal operation, the proximity to the blue electron gun may not cause any problem. However, when a low current bias measurement is made in an automatic kine bias (AKB) circuit, during several video line times that immediately follow vertical retrace, referred to as the AKB measurement interval, stray coupling of the horizontal component of the dynamic focus voltage may introduce an error in the biasing of the cathode electrode of the blue electron gun. As a result, the bias of the blue electron gun may not track the bias of the green and red electron guns. This may lead to unacceptable background color temperature changes.

It may be desirable to remove the horizontal dynamic focus voltage component from the focus electrode, during the AKB measurement interval. Thereby, the undesirable coupling to the focus electrode is, advantageously, eliminated. It may also be desirable to prevent a significant transient of the focus voltage, after the end of the AKB measurement interval. Such transient could occur when the horizontal dynamic focus voltage is restored, after the AKB measurement interval.

In carrying out an inventive feature, during vertical retrace and during the AKB measurement interval, the focus voltage amplifier prevents coupling of energy from the dynamic focus circuit to the AKB circuit. Instead, a constant current is fed to a load resistor to develop an output voltage of the amplifier that is approximately equal to the positive peak of the summed parabolic voltage components, during the AKB measurement interval. Advantageously, this is done to prevent the aforementioned transient focus voltage error of several hundred volts when vertical scanning resumes at the left end of the first visible horizontal line following the AKB measurement interval.

A video imaging apparatus, embodying an aspect of the invention, includes an amplifier having a first input responsive to a focus voltage correction input signal for generating at an output of the amplifier a dynamic focus voltage component of a focus voltage that is coupled to a focus electrode. A first semiconductor switch is responsive to a periodic control signal and coupled to a signal path of the focus voltage correction input signal for disabling the dynamic focus voltage component, during an automatic kine bias measurement interval of a deflection cycle. A second semiconductor switch is responsive to a periodic control signal and coupled to the amplifier for applying a second input signal to a second input of the amplifier to control the focus voltage, during the automatic kine bias measurement interval. Outside the automatic kine bias measurement interval, the second input signal is decoupled from the amplifier.

DESCRIPTION OF THE PREFERRED EMBODIMENTS

Figure 1A:
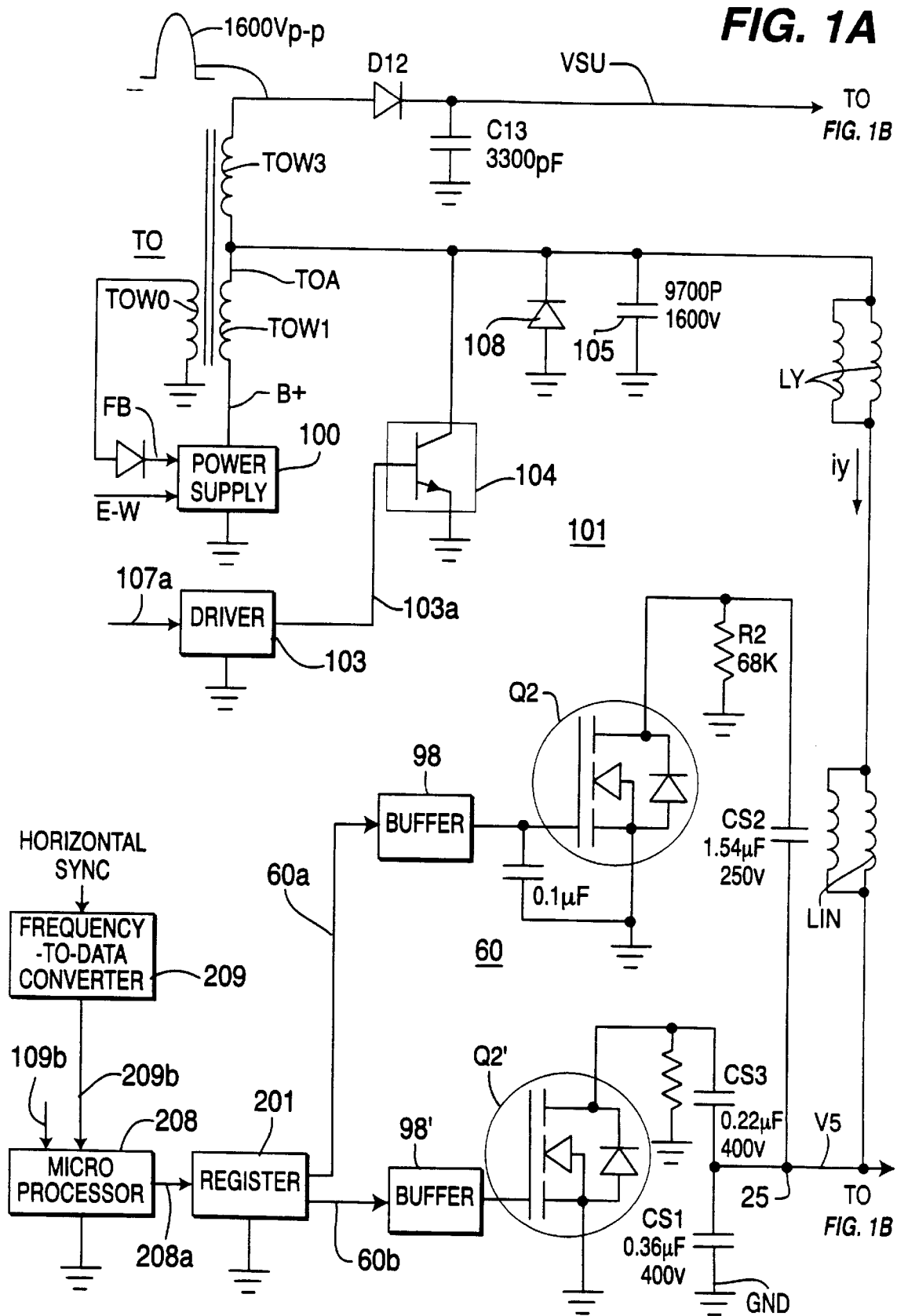
FIGS. 1A and 1B illustrate a horizontal deflection circuit output stage and a dynamic voltage generator, in accordance with an inventive feature.

FIG. 1A illustrates a horizontal deflection circuit output stage 101 of a television receiver having multi-scan frequency capability. Stage 101 is energized by a regulated power supply 100 that generates a supply voltage B+. A conventional driver stage 103 is responsive to an input signal 107a at the selected horizontal scanning frequency $nf_H$. Driver stage 103 generates a drive control signal 103a to control the switching operation in a switching transistor 104 of output stage 101. By way of example, a value of n=1 may represent the horizontal frequency of a television signal according to a given standard such as a broadcasting standard. The collector of transistor 104 is coupled to a terminal T0A of a primary winding T0W1 of a flyback transformer T0. The collector of transistor 104 is also coupled to a non-switched retrace capacitor 105. The collector of transistor 104 is additionally coupled to a horizontal deflection winding LY to form a retrace resonant circuit. The collector of transistor 104 is also coupled to a conventional damper diode 108. Winding LY is coupled in series with a linearity inductor LIN and a non-switched trace or S-capacitor CS1. Capacitor CS1 is coupled between a terminal 25 and a reference potential, or ground GND such that terminal 25 is interposed between inductor LIN and S-capacitor CS1.

Output stage 101 is capable of producing a deflection current iy. Deflection current iy has substantially the same predetermined amplitude for any selected horizontal scan frequency of signal 103a selected from a range of $2f_H$ to $2.4f_H$ and for a selected horizontal frequency of $1f_H$. Controlling the amplitude of deflection current iy is accomplished by automatically increasing voltage B+ when the horizontal frequency increases, and vice versa, so as to maintain constant amplitude of deflection current iy. Voltage B+ is controlled by a conventional regulated power supply 100 operating in a closed-loop configuration via a feedback winding T0W2 of transformer T0. The magnitude of voltage B+ is established, in accordance with a rectified, feedback flyback pulse signal FB having a magnitude that is indicative of the amplitude of current iy. A vertical rate parabola signal E-W is generated in a conventional way, not shown. Signal E-W is conventionally coupled to power supply 100 for producing a vertical rate parabola component of voltage B+ to provide for East-West distortion correction.

A switching circuit 60 is used for correcting a beam landing error such as linearity. Circuit 60 selectively couples none, only one or both of a trace or S-capacitor CS2 and a trace or S-capacitor CS3 in parallel with trace capacitor CS1. The selective coupling is determined as a function of the range of frequencies from which the horizontal scan frequency is selected. In switching circuit 60, capacitor CS2 is coupled between terminal 25 and a drain electrode of a field effect transistor (FET) switch Q2. A source electrode of transistor Q2 is coupled to ground GND. A protection resistor R2 that prevents excessive voltage across transistor Q2 is coupled across transistor Q2.

A register 201 applies switch control signals 60a and 60b. Control signal 60a is coupled via a buffer 98 to a gate electrode of transistor Q2. When control signal 60a is at a first selectable level, transistor Q2 is turned off. On the other hand, when control signal 60a is at a second selectable level, transistor Q2 is turned on. Buffer 98 provides the required level shifting of signal 60a to accomplish the above mentioned switching operation, in a conventional manner.

In switching circuit 60, capacitor CS3 is coupled between terminal 25 and a drain electrode of a FET switch Q2'. FET switch Q2' is controlled by control signal 60b in a similar way that FET switch Q2 is controlled by control signal 60a. Thus, a buffer 98' performs a similar function as buffer 98.

A microprocessor 208 is responsive to a data signal 209a generated in a frequency-to-data signal converter 209. Signal 209a has a numerical value that is indicative of the frequency of a synchronizing signal HORZ-SYNC or deflection current iy. Converter 209 includes, for example, a counter that counts the number of clock pulses, during a given period of signal HORZ-SYNC and generates word signal 209a in accordance with the number of clock pulses that occur in the given period. Microprocessor 208 generates a control data signal 208a that is coupled to an input of register 201. The value of signal 208a is determined in accordance with the horizontal rate of signal HORZ-SYNC. Register 201 generates, in accordance with data signal 208a, control signals 60a and 60b at levels determined by signal 208a, in accordance with the frequency of signal HORZ-SYNC. Alternatively, the value of signal 208a may be determined by a signal 109b that is provided by a keyboard, not shown.

When the frequency of horizontal deflection current iy is $1f_H$ transistors Q2 and Q2' are turned on. The result is that both S-capacitors CS2 and CS3 are in-circuit S-capacitors that are coupled in parallel with non-switched S-capacitor CS1 and establish a maximum S-capacitance value. When the frequency of horizontal deflection current iy is equal to or greater than $2 f_H$ and less than $2.14 f_H$, transistor Q2 is turned off and transistor Q2' is turned on. The result is that S-capacitor CS2 is decoupled from non-switched S-capacitor CS1 and S-capacitor CS3 is coupled to S-capacitor CS1 to establish an intermediate S-capacitance value. When the frequency of horizontal deflection current iy is equal to or greater than $2.14 f_H$, transistors Q2 and Q2' are turned off. The result is that S-capacitors CS2 and CS3 are decoupled from non-switched S-capacitor CS1 and establish a minimum S-capacitance value. Deflection current iy in capacitor CS1, CS2 or CS3 produces an S-shaping parabolic voltage V5.

The total retrace capacitance formed by capacitor 105 does not change at the different scan frequencies. Therefore, the retrace interval has the same length at the different scan frequencies. The values of capacitors CS1, CS2 and CS3 are selected to produce parabolic voltage V5 at different amplitudes at different scan frequencies. The different amplitudes of voltage V5 are required because the retrace interval length is constant.

Figure 1B:
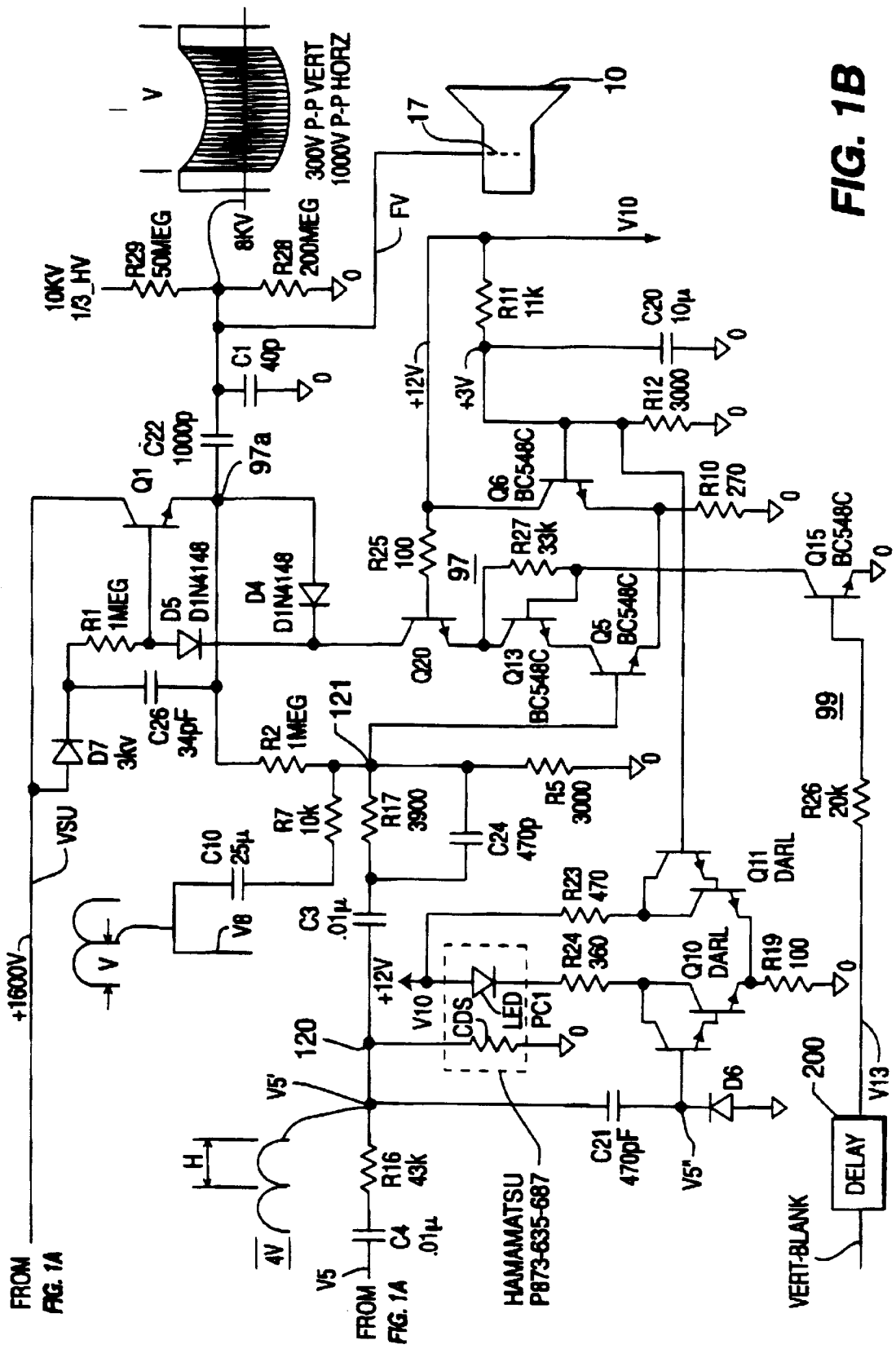

FIG. 1B illustrates a dynamic focus voltage generator 99, embodying an inventive feature. Similar symbols and numerals in FIGS. 1A and 1B indicates similar items or functions. Voltage V5 of FIG. 1B has negative going retrace peaks. The peak to peak amplitude of parabolic voltage V5 is about 60V at 16 KHz or $1f_H$, 80V at $2f_H$ and 125V at $2.4f_H$. Parabola voltage V5 is capacitively coupled via a capacitor C4 to a resistor R16.

A controlled voltage divider or attenuator that includes resistor R16 and a resistor CDS develops an attenuated parabolic voltage V5' at a terminal 120. The attenuation of the voltage divider is determined by the state of conduction of cadmium sulfide photo resistor CDS that is a part of a photo-coupler PC1. Photo resistor CDS is responsive to light from a light emitting diode LED that is part of photo coupler PC1. The light from diode LED is responsive to a current from a darlington transistor Q10. Darlington transistor Q10 and a darlington transistor Q11 are coupled to each other and to a resistor R19, a resistor R23 and a resistor R24 to form a differential amplifier. The base of Darlington transistor Q11 is coupled to a constant reference voltage of 3 volts derived from a 12V supply via resistive divider formed by a resistor R11 and a resistor R12.

The DC component of voltage V5' is near 0 volts. The AC component is determined by resistors R16 and CDS and a resistor R17. The value of resistor CDS is determined by the light energy from light emitting diode LED. The AC component of voltage V5', a voltage V5", is coupled through a capacitor C21 to the base of Darlington transistor Q10 and to the cathode of a clamping diode D6. The negative peak of voltage V5" is held at –0.6 volts by clamping diode D6. The positive peak of voltage V5" will turn on Darlington transistor Q10 when the level of +3 volts at the base of Darlington transistor Q11 is exceeded. When Darlington transistor Q10 turns on, current flows through diode LED and light flux is produced. This light flux acts on resistor CDS so as to reduce its resistive value, the amplitude of voltage V5' and the amplitude of voltage V5". The speed of response of the change of the resistive value of resistor CDS is very slow. This acts as a low pass filter in the negative feedback loop. As the positive peak value of V5" lowers to +3V, the on time of transistor Q10 shortens and the average light energy from diode LED decreases until a balance is established. The positive peak amplitude of voltage V5" is then maintained at slightly greater than +3 volts. The peak-to-peak amplitude of voltages V5" and V5' is maintained at about 4 volts independent of input frequency or amplitude.

Drive voltage V5', developed at junction terminal 120 of resistors CDS and R16, is capacitively coupled through a capacitor C23, a resistor R17 and a capacitor C24 to a summing junction input terminal 121 of a focus amplifier 97. The gain control action of resistor CDS regulates the voltage at terminal 121 to have equal peak-to-peak amplitude at each of the $1f_H$, $2f_H$ and $2.4f_H$ rates.

Capacitor C23 provides capacitive coupling for the horizontal parabola. A capacitor CIO capacitively couples a vertical parabola V8, produced in a conventional manner, not shown, to terminal 121. The direct current operating point of focus amplifier 97 is determined by a resistor R5 and not by the parabolic signals, because the capacitive coupling eliminates a direct current component. Capacitor C24 corrects a phase delay caused by a stray input capacitance, not shown, of amplifier 97 so that the horizontal focus correction is properly timed.

In amplifier 97, a transistor Q5 and a transistor Q6 are coupled to each other to form a differential input stage. These transistors have very high collector current-to-base current ratio, referred to as beta, to increase the input impedance at terminal 121. The base-emitter junction voltages of transistors Q5 and Q6 compensate each other and reduce direct current bias drift with temperature changes. Resistor R11 and resistor R12 form a voltage divider that is applied to a supply voltage V10 at +12V for biasing the base voltage of transistor Q6 at about +3V. The value of an emitter resistor R10 that is coupled to the emitters of transistors Q5 and Q6 is selected to conduct a maximum current of about 6 mA. This protects a high voltage transistor Q20.

Transistor Q20 is coupled to transistor Q5 via a transistor Q13 operating as a switch. Transistor Q20 is coupled to transistor Q5 via transistor Q13 in a cascode configuration. Transistor Q20 needs to be protected from being over-driven because transistor Q20 can tolerate only up to 10 mA collector current. This is accomplished because amplifier 97 has high transconductance at a collector current of up to 6 mA and lower transconductance above 6 mA. The cascode configuration of transistors Q20, Q13 and Q5 isolates the Miller capacitance, not shown, across the collector-base junction of transistor Q20, thereby the bandwidth is increased. The cascode configuration also makes the amplifier gain independent of the low beta of high voltage transistor Q20.

A winding T0W3 of transformer T0 of FIG. 1A produces a stepped-up retrace voltage that is rectified in a diode D12 and filtered in a capacitor C13 to produce a supply voltage VSU for energizing dynamic focus voltage generator 99 of FIG. 1B. An active pull up transistor Q1 has a collector coupled to supply voltage VSU. A pull-up base resistor R1 of transistor Q1 is coupled to voltage VSU via a bootstrap or boosting arrangement that includes a diode D7 and a capacitor C26. A diode D5 is coupled in series with resistor R1 and is coupled to the collector of transistor Q20. A diode D4 is coupled between the emitter of transistor Q1 at an output terminal 97a of amplifier 99 and the collector of transistor Q20.

During the negative peaks of the output waveform at terminal 97a, diode D7 clamps an end terminal of capacitor C26 at the cathode of diode D7 to the +1600V supply voltage VSU and transistor Q20 pulls the other end terminal of capacitor C16 to near ground potential. Transistor Q1 is held off by the actions of diodes D4 and D5. As the voltage at terminal 97a rises, the energy stored in capacitor C26 is fed through resistor R1 to the base of transistor Q1. The voltage across resistor RI is maintained high, and base current in transistor Q1 also is maintained, even as the collector-to-emitter voltage across transistor Q1 approaches zero. Therefore, transistor Q1 emitter current is maintained. The output positive peak at terminal 97a can then be very near the +1600V supply voltage VSU without distortion.

A capacitance C1 represents the sum of the stray capacitance of focus electrode 17 and of the wiring. Active pull-up transistor Q1 is capable of sourcing a current from terminal 97a to charge stray capacitance C1. Pull-down transistor Q20 is capable of sinking current via diode D4 from capacitance C1. Advantageously, the active pull up arrangement is used to obtain fast response time with lowered power dissipation. Amplifier 97 uses shunt feedback for the output at terminal 97a via a feedback resistor R2. Resistors R17 and R2 are selected to produce 1000V horizontal rate voltage at terminal 97a. As a result, the voltage gain of amplifier 97 is several hundred.

Dynamic focus voltage components at the horizontal rate produced by voltage V5 and at the vertical rate produced by voltage V8 are capacitively coupled via a direct current blocking capacitor C22 to a focus electrode 17 of a CRT 10 to develop a dynamic focus voltage FV. A direct current voltage component of voltage FV, developed by a voltage divider formed by a resistor R28 and a resistor R29, is equal to 8 KV.

A periodic control signal V13 is at a HIGH state, during vertical blanking and during, for example, four video line time that follow the vertical blanking, referred to as the AKB measurement interval, not shown. Signal V13 is produced by a delay circuit 200, embodying an inventive feature, that delays a conventional vertical blanking signal VERT-BLANK by a suitable number of video line times such as three or four.

Signal V13 is coupled via a resistor R26 to the base of a switch transistor Q15. The collector of transistor Q15 is coupled via a resistor R27 to a junction terminal between the emitter of transistor Q20 and the collector of transistor Q13. The collector of transistor Q13 is coupled to the emitter of transistor Q20 and the emitter of transistor Q13 is coupled to the collector of transistor Q5. During vertical blanking and during the AKB measurement interval, transistor Q13 is turned off by transistor Q15 and blocks the flow of current from the collector of transistor Q5 to the emitter of transistor Q20.

In carrying out an inventive feature, emitter current for Q20 is maintained during the AKB measurement interval via resistor R27 and transistor Q15. Resistor R27 is coupled between the emitter of transistor Q20 and ground during the AKB measurement interval. During the AKB measurement interval, resistor R27 has across it a constant voltage of about 11.3 volts. The value of resistor R27 is chosen to cause a constant current in transistor Q20 such that a voltage developed across resistor R1 is equal to the difference between supply voltage VSU and the peak value of the dynamic focus voltage at terminal 97a. This eliminates an undesired focus voltage transient and first video line misfocusing that could otherwise occur when the normal dynamic focus voltage starts after the AKB measurement interval. If resistor R27 were not coupled to the emitter of transistor Q20, amplifier 97 output voltage at terminal 97a would tend to reach the +1600V level of supply voltage VSU. However, the required peak of the waveform at terminal 97a is typically 1450V. If the amplifier output voltage at terminal 97a were to become 1600V, during the AKB measurement interval, a large transient would have occurred at the start of the first visible horizontal line, at the top of the picture. The transient, disadvantageously, would have caused the beginning portion of the first visible horizontal line, that occurs following the AKB measurement interval, to be defocused.

To prevent such large transient, the current in transistor Q15, which provides current path to transistor Q20 through resistor R27, decreases the output voltage at terminal 97a, during vertical blanking and during the AKB measurement interval. Transistor Q20 acts as a current source and causes a voltage drop across resistor R1. During the AKB measurement interval, the dynamic focus voltage at terminal 97a is set to a level approximately equal to the peak of the summed horizontal and vertical parabolic components. Thereby, advantageously, focus voltage transient is significantly reduced, following the AKB measurement interval.

What is claimed is:
1. A video imaging apparatus, comprising:
 a cathode-ray tube including a focus electrode;
 a source of a focus voltage correction input signal;
 an amplifier having a first input responsive to said focus voltage correction input signal for generating at an output of said amplifier a dynamic focus voltage component of a focus voltage that is coupled to said focus electrode;

a first semiconductor switch responsive to a first periodic control signal and coupled to a signal path of said focus voltage correction input signal for disabling said dynamic focus voltage component, during an automatic kine bias measurement interval of a deflection cycle; and a second semiconductor switch responsive to a second periodic control signal and coupled to said amplifier for applying a second input signal to a second input of said amplifier to control said focus voltage, during said automatic kine bias measurement interval, such that, outside said automatic kine bias measurement interval, said second input signal is decoupled from said amplifier.

2. A video imaging apparatus according to claim 1 wherein the operation of said second semiconductor switch establishes said amplifier output voltage, at an end time of said automatic kine bias measurement interval, at a level closer to a level determined by a portion of said focus voltage correction input signal, after said automatic kine bias measurement interval has ended.

3. A video imaging apparatus according to claim 1 wherein said first semiconductor switch and said second semiconductor switch tend to change said focus voltage in opposite directions, during said automatic kine bias measurement interval.

4. A video imaging apparatus according to claim 1 wherein said amplifier comprises a pair of transistors coupled to each other in a cascode configuration and wherein said first semiconductor switch comprises a transistor coupled between said pair of transistors.

5. A video imaging apparatus according to claim 1 wherein said amplifier comprises a first transistor coupled to a load resistor and an output transistor coupled to said output and responsive to a signal developed in said load resistor and wherein said second semiconductor switch is coupled to said load resistor to change a direct current voltage in said load resistor, during said automatic kine bias measurement interval.

6. A video imaging apparatus according to claim 1 wherein said focus voltage is capacitively coupled from said amplifier output to said focus electrode.

7. A video imaging apparatus according to claim 1 wherein each of said switches comprises a transistor responsive to a common focus voltage blanking signal.

8. A video imaging apparatus, comprising a cathode-ray tube including a focus electrode;

a source of a focus voltage correction input signal;

a first transistor responsive to said input signal and coupled to a control terminal of a second transistor, said second transistor being coupled to said focus electrode to supply a current in a first direction by forming an active pull-up arrangement, and said first transistor being further coupled to said focus electrode in a manner that bypasses said second transistor to supply a current in an opposite direction by forming an active pull-down arrangement, said first and second transistors developing a dynamic focus voltage at said focus electrode;

a source of a periodic focus voltage blanking signal; and a third transistor responsive to said blanking signal for coupling said first transistor to said focus electrode, outside an automatic kine bias measurement interval, and for decoupling said first transistor from said focus electrode to disable said dynamic focus voltage, during said automatic kine bias measurement interval.

9. A video imaging apparatus according to claim 8 further comprising, a fourth transistor for coupling therethrough said first transistor to said focus electrode such that said first and fourth transistors are coupled in a cascode arrangement.

10. A video imaging apparatus according to claim 9 wherein said third transistor is coupled between said first and fourth transistors.

11. A video imaging apparatus according to claim 9 further comprising, a load resistance coupled to said first transistor and to said control terminal of said second transistor and a fourth transistor operating as a switch and responsive to said blanking signal for applying a current to said load resistance to control said focus voltage, during said automatic kine bias measurement interval.

12. A video imaging apparatus according to claim 8 further comprising, a load resistance coupled to said first transistor and to said control terminal of said second transistor and a fourth transistor operating as a switch and responsive to said blanking signal for applying a current to said load resistance to control said focus voltage, during said automatic kine bias measurement interval.

13. A video imaging apparatus according to claim 8 further comprising, a fourth transistor coupled to said first transistor to form therewith a differential amplifier.

* * * * *